(No Model.)
J. C. SPEIRS.
SADDLE.
No. 536,403.
Patented Mar. 26, 1895.
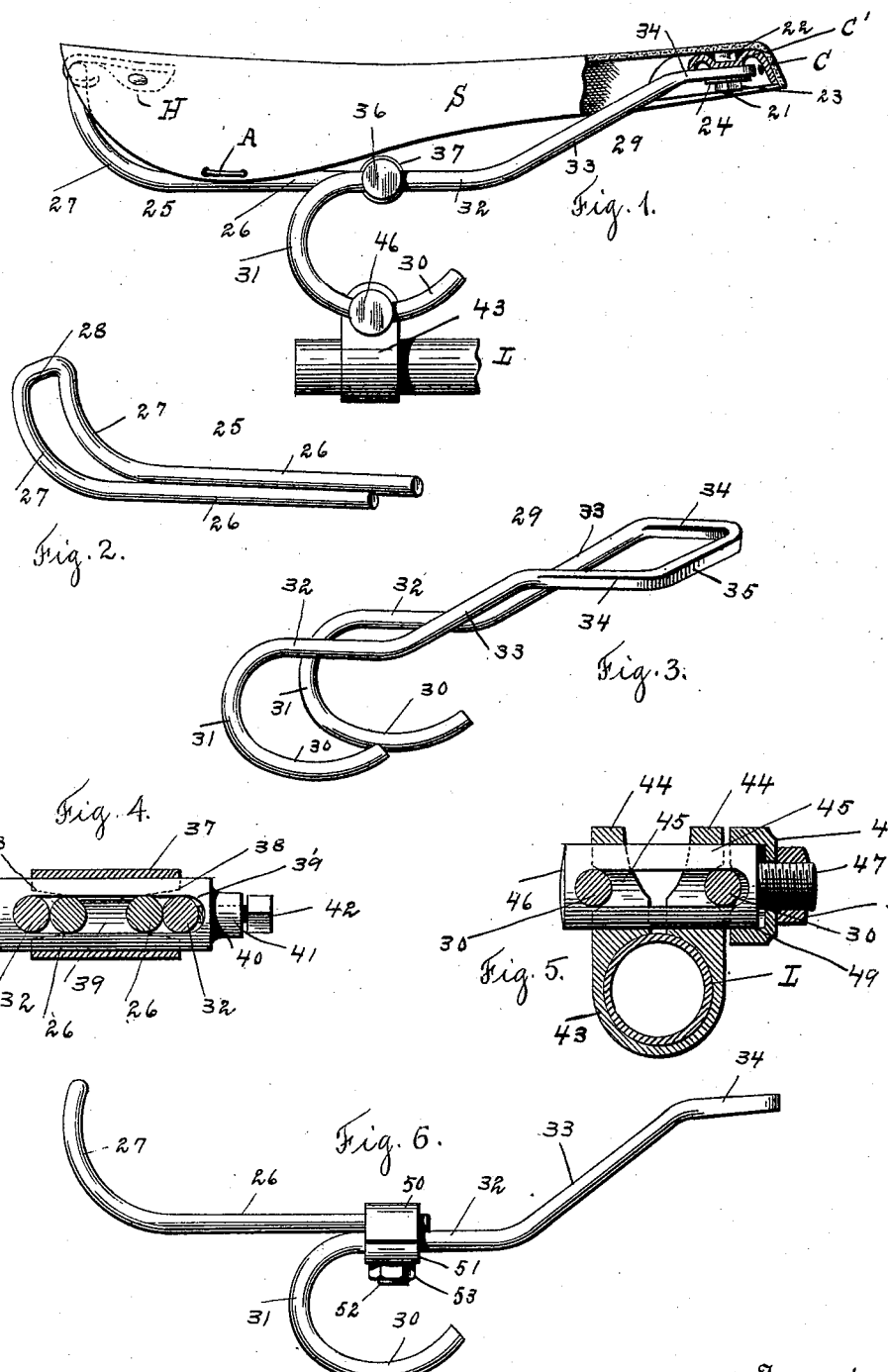

UNITED STATES PATENT OFFICE.

JOHN C. SPEIRS, OF WORCESTER, MASSACHUSETTS, ASSIGNOR TO THE SPEIRS MANUFACTURING COMPANY, OF SAME PLACE.

SADDLE.

SPECIFICATION forming part of Letters Patent No. 536,403, dated March 26, 1895.

Application filed March 2, 1894. Serial No. 502,089. (No model.)

*To all whom it may concern:*

Be it known that I, JOHN C. SPEIRS, a citizen of the United States, residing at Worcester, in the county of Worcester and State of Massachusetts, have invented a new and useful Improvement in Saddles, of which the following is a specification.

The aim of this invention is to provide a new and improved means for securing saddles or seats in place, especially in velocipedes or bicycles, which shall be very simple, admit of ready adjustment, and be easy of manufacture.

To this end, the invention consists of the device described and claimed in this specification, and illustrated in the accompanying sheet of drawings, in which—

Figure 1 is a side elevation partly in section of my improved device. Fig. 2 is a perspective view of a part I term the forward spring support. Fig. 3 is a perspective view of a part I term the rear spring support. Fig. 4 is a sectional view illustrating the clamp for securing the two spring supports together. Fig. 5 is a sectional view illustrating the clamp for securing the rear spring support to the seat-post, and Fig. 6 represents a modification of the clamp used between the two spring supports.

The special object of my invention is to provide a simple and efficient means for securing saddles in place, which shall admit of a peculiar rocking adjustment hereinafter described, and which shall be very simple and easy of manufacture.

Referring to the drawings, and in detail, S represents the usual leather seat or saddle, to the inside forward end of which is secured a hook H, and to the rear end of which is secured a cantle C, the cantle and saddle being riveted together to hold the rear end of the saddle or seat in place in the usual manner.

My improved support consists of two springs, each of which is made preferably of a single piece of spring wire bent as hereinafter described, a peculiar clamp for clamping the two together, and a peculiar clamp for clamping the same in place on the seat-post.

25 represents the forward spring support. This forward spring support is made of a single piece of wire which is bent so as to have straight arms 26—26 and the upper curved arms 27—27, which unite as at 28, thus forming a hook or clasp, around which the hook H is adapted to be secured to hold the forward end of the saddle S in place. The two flaps of this seat S can be stitched together, if desired, as at A. The rear spring support 29 is also made of a single piece of spring wire. This wire is bent so as to have the two curved arms 30—30, and then is bent around on the curve as at 31—31, then around the straight portions 32—32, the upward extending portions 33—33, then the horizontal portions 34—34, which unite as at 35. The portions 34—34 and 35 of this rear spring support, are preferably flattened, as shown.

The cantle C has a pocket as C' into which fits a bolt 20, which has threaded on its lower end a nut 23, under which is placed a washer 24, and by this means, the flattened portions 34—34 and 35 of the rear spring support can be adjustably secured to the cantle.

The arms 26—26 of the forward spring support 25 are made so that they will just fit within the arms 32—32 of the rear spring support, and a peculiar clamp is used to secure the two spring arms together. This clamp consists of a cylindrical bushing or sleeve 37, which is cut in or notched on its ends as at 38—38. Fitting into this bushing 37 is the post 36. This post 36 has a slot 39 cut in the same, into which the arms 26—26 and 32—32 are passed when the post is in place in the bushing 37.

The post 36 has an extending boss 40 in which is tapped a screw 41 which has a head 42. By this means, the two spring supports will be rigidly clamped together, as the bolt 41 is screwd up. As the bolt 41 is screwed up, it will push or draw the arms 32—32 against the arms 26—26, and this motion will be limited by the arms 26—26 striking or bearing against the bottoms of the notches 38—38. By this means, an efficient, strong, and simple clamp is provided for clamping the two wire supports together.

The leather S may be adjusted on its two spring supports either by loosening the nut 23 and adjusting the cantle on the rear spring support, or by loosening the screw 41, and by adjusting the two spring supports relatively to each other.

A peculiar clamp is provided to secure the rear spring support to the seat-post L, and thus the saddle in place. This clamp consists of a sleeve 43 which is bored out so as to nicely fit on the seat-post L, and this clamp 43 has extending arms 44—44, through which is bored a hole, into which the post 46 can fit. These two arms 44—44 are slightly separated from each other as shown. The post 46 has a slot 45 cut in the same as shown, and the sides of the lugs or projections 44—44 are notched so as to receive the arms 30—30 of the rear spring support through the slot 45 of the post 46.

Fitting on one end of the post 46 is a cap 48 which extends over the post as at 48, and which will bear against the arm 30 nearest the same. The post 46 has an extending screw-threaded shank 47, on which is threaded a nut 50, which is adapted to bear against the sleeve or collar 48. By this means, when the nut 50 is screwed up, the extending sleeve or collar 49 of the collar 48 will be forced against the arm 30 nearest the same, and this sleeve 48 is preferably slightly notched or grooved so as to nicely bear against the arm 30. As the nut 50 is screwed up, this will draw the other arm 30 tightly against its lug 44, and will thus tightly clamp the rear spring support in place. Also at the same time, the tendency will be to draw the two lugs 44—44 of the clamp 43 together around the seat-post L and thus also to secure the clamp on the seat-post.

Thus, this clamp by a single nut, accomplishes both functions of securing the rear spring support in place in the same, and also of securing the clamp to the seat-post, which provides a very simple and economical construction.

Of course other forms of clamps can be used to secure the two spring supports together, and one of such other forms is shown in Fig. 6. In this instance, the means for securing the two spring supports together consists of a clamp made in two parts 500 and 51, which are adapted to bite on the arms 32—32 and 26—26 of the spring supports, and by means of screw 52 and nut 53 clamp the two together.

By means of the peculiar clamping means for securing the rear support to the seat post, it will be seen that I have provided a rocking or tipping adjustment, depending upon the curvature of the arms 30. Thus, by loosening the nut 50, the saddle can be pushed forward or backward on the seat-post, and can be tipped at any desired angle, and the whole can then be secured in place simply by turning the nut 50. This means forms a very efficient adjusting mechanism for saddles of this kind, and, of course, so far as this rocking adjustment is concerned, other spring supports could be used, the only essential part co-operating with this clamp being the two curved arms 30—30.

The details of the invention herein described may be greatly varied by a skilled mechanic without departing from the scope of my invention, as expressed in the claims.

Having thus fully described my invention, what I claim, and desire to secure by Letters Patent, is—

1. In a bicycle saddle, the combination of a leather seat, a spring support for said seat constructed of cylindrical wire, a seat-post for supporting the saddle, and a clamp for securing the spring support to said seat-post, said clamp consisting of a split clamp having extended perforated arms, a slotted bolt or post, and an exterior threaded clamping device for tightening said slotted post to secure the wires of the spring support together and to secure the split clamp to the seat-post, substantially as described.

2. In a bicycle saddle, the combination of a leather seat, a support for said seat consisting of a forward spring support and a rear spring support, and a clamp for securing said supports together, said clamp consisting of a perforated sleeve, a slotted bolt or post extending through said sleeve, and a clamping device at one end of the slotted bolt for forcing the spring wires against the perforated sleeve and for securing them together, substantially as described.

3. In a bicycle saddle, the combination of a leather seat, a support for said seat comprising a forward spring support and a rear spring support, said supports being formed of cylindrical spring wire, a clamp for securing the parts of said support together, said clamp comprising a perforated sleeve, a slotted bolt or post extending through said sleeve and adapted to be actuated by an exterior clamping bolt, and a clamping device for securing the spring support to the seat-post, said clamping device comprising a split clamp for engaging the seat-post, and a slotted bolt or post adapted to be actuated by an exterior clamping device for compressing said split clamp and securing the same to the seat-post, substantially as described.

In testimony whereof I have hereunto set my hand in the presence of two subscribing witnesses.

JOHN C. SPEIRS.

Witnesses:
PHILIP W. SOUTHGATE,
E. M. HEALY.